United States Patent
Yagami

(10) Patent No.: US 9,840,162 B2
(45) Date of Patent: Dec. 12, 2017

(54) VEHICLE

(71) Applicant: TOYOTA JIDOSHA KABUSHIKI KAISHA, Toyota-shi, Aichi-ken (JP)

(72) Inventor: Yuichi Yagami, Kuwana (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/926,406

(22) Filed: Oct. 29, 2015

(65) Prior Publication Data

US 2016/0129806 A1    May 12, 2016

(30) Foreign Application Priority Data

Nov. 12, 2014 (JP) .................................. 2014-229376

(51) Int. Cl.
*B60K 1/04* (2006.01)
*B60L 11/18* (2006.01)
*B60L 3/00* (2006.01)
*H01M 8/0202* (2016.01)

(52) U.S. Cl.
CPC ............ *B60L 11/1881* (2013.01); *B60K 1/04* (2013.01); *B60L 3/0053* (2013.01); *H01M 8/0202* (2013.01); *B60K 2001/0438* (2013.01); *H01M 2250/20* (2013.01); *Y02T 90/32* (2013.01)

(58) Field of Classification Search
CPC .............. B60L 11/1881; B60L 11/1896; B60L 11/1888; B60L 13/0007; B60L 13/0053; B60K 1/04; B60K 2001/0438; B60K 28/00; B60R 16/0207; B60R 16/0215; B60R 16/0238; H02G 3/00; G01M 8/00; G01M 8/0202
See application file for complete search history.

(56) References Cited

U.S. PATENT DOCUMENTS

| | | | |
|---|---|---|---|
| 7,270,202 B2 * | 9/2007 | Kondo | B60K 1/00 180/65.1 |
| 8,936,303 B2 * | 1/2015 | Awakawa | B60R 16/0215 296/208 |
| 2011/0068622 A1 * | 3/2011 | Ikeno | B60K 1/00 307/10.1 |
| 2012/0021301 A1 * | 1/2012 | Ohashi | B60K 1/04 429/400 |
| 2012/0024598 A1 | 2/2012 | Awakawa et al. | |
| 2013/0162075 A1 * | 6/2013 | Chinavare | H05K 9/0098 310/85 |

FOREIGN PATENT DOCUMENTS

| | | |
|---|---|---|
| JP | H07-277056 A | 10/1995 |
| JP | 2004-319277 | 11/2004 |
| JP | 2007-182130 | 7/2007 |
| JP | 2009-266491 A | 11/2009 |
| JP | 2009-298207 | 12/2009 |
| JP | 2009298207 A * | 12/2009 |

* cited by examiner

*Primary Examiner* — James A Shriver, II
*Assistant Examiner* — Steve Clemmons
(74) *Attorney, Agent, or Firm* — Finnegan, Henderson, Farabow, Garrett & Dunner, LLP

(57) ABSTRACT

In order for a vehicle to which a fuel cell module is mounted to fully secure an electric connection between a vehicle body and the fuel cell module, a vehicle is provided, which includes a conductive plate-like member, constituting at least a part of a floor portion of a vehicle body of the vehicle, and having a protruded portion protruded upwardly in the gravity directions and extended from the front to the rear of the vehicle, a fuel cell module, provided downward in the gravity directions from the plate-like member, and accommodating a fuel cell, and a grounding wire, electrically connecting the fuel cell module with the plate-like member within a range when seen in the gravity direction where the protruded portion exists.

4 Claims, 3 Drawing Sheets

VEHICLE

CROSS REFERENCE TO RELATED APPLICATION

This application claims priority to Japanese Patent Application No. 2014-229376, filed on Nov. 12, 2014, the contents of all of which are incorporated herein by reference in their entirety.

BACKGROUND OF THE INVENTION

The present invention relates to a vehicle.

Generally, vehicles have a configuration in which one of a cathode and a anode of a direct current (DC) power supply is electrically connected with a vehicle body (chassis) to utilize the vehicle body having conductivity as electric wiring (i.e., a body earth). JP2004-319277A and JP2009-298207A disclose that the body earth is adopted in a vehicle to which a fuel cell is mounted, and a fuel cell module accommodating the fuel cell is electrically connected with the vehicle body.

The vehicle disclosed in JP2004-319277A and JP2009-298207A does not fully take into consideration securing the electric connection between the vehicle body and the fuel cell module even when an impact which deforms the vehicle body is received.

SUMMARY

The present invention is made in order to address at least a part of the subject described above, and can be implemented in terms of the following aspects.

(1) According to one aspect of the invention, a vehicle is provided. The vehicle includes a conductive plate-like member, constituting at least a part of a floor portion of a vehicle body of the vehicle, and having a protruded portion protruded upwardly in the gravity directions and extended from the front to the rear of the vehicle, a fuel cell module, provided downward in the gravity directions from the plate-like member, and accommodating a fuel cell, and a grounding wire, electrically connecting the fuel cell module with the plate-like member within a range when seen in the gravity direction where the protruded portion exists. According to this aspect, the protruded portion with relatively high rigidity in the floor portion of the vehicle body can prevent damages to the grounding wire due to a deformation of the vehicle body.

(2) In the vehicle of the aspect described above, the plate-like member may include a through-hole, penetrating a part of the protruded portion, and a fastening portion, located upward in the gravity directions from the through-hole, and fastened to the grounding wire extended through the through-hole from the fuel cell module. According to this aspect, a possibility that water entering via the through-hole from outside the floor portion of the vehicle body reaches the fastening portion can be reduced. As a result, a generation of rust in the fastening portion can be reduced.

(3) In the vehicle of the aspect described above, the grounding wire electrically connect a part of the fuel cell module on the protruded portion side with the plate-like member within the range when seen in the gravity direction where the protruded portion exists. According to this aspect, the grounding wire can be disposed in the area between the fuel cell module and the protruded portion. As a result, damages to the grounding wire can further be prevented.

(4) In the vehicle of the aspect described above, the protruded portion may be located at the center in vehicle width directions of the vehicle. According to this aspect, a possibility that the protruded portion is deformed when the vehicle receives an impact from the side can be reduced. As a result, damages to the grounding wire can further be prevented.

(5) In the vehicle of the aspect described above, the protruded portion may be located between seats in vehicle width directions of the vehicle. According to this aspect, damages to the grounding wire can further be prevented because the protruded portion is located at the part of the vehicle body between the seats, which is relatively hard to be deformed against the impact.

The aspects of the present invention are not limited to the vehicle, but can also be applied to various forms, such as a structure of electrically connecting the fuel cell module with the vehicle body, and a method of electrically connecting the fuel cell module with the vehicle body. Further, the invention is not intended to be limited to the aspects described above, but may be implemented in various forms without-departing from the scope of the invention.

BRIEF DESCRIPTION OF THE DRAWINGS

The present disclosure is illustrated by way of example and not by way of limitation in the figures of the accompanying drawings.

DETAILED DESCRIPTION OF EMBODIMENTS

Figure 1:
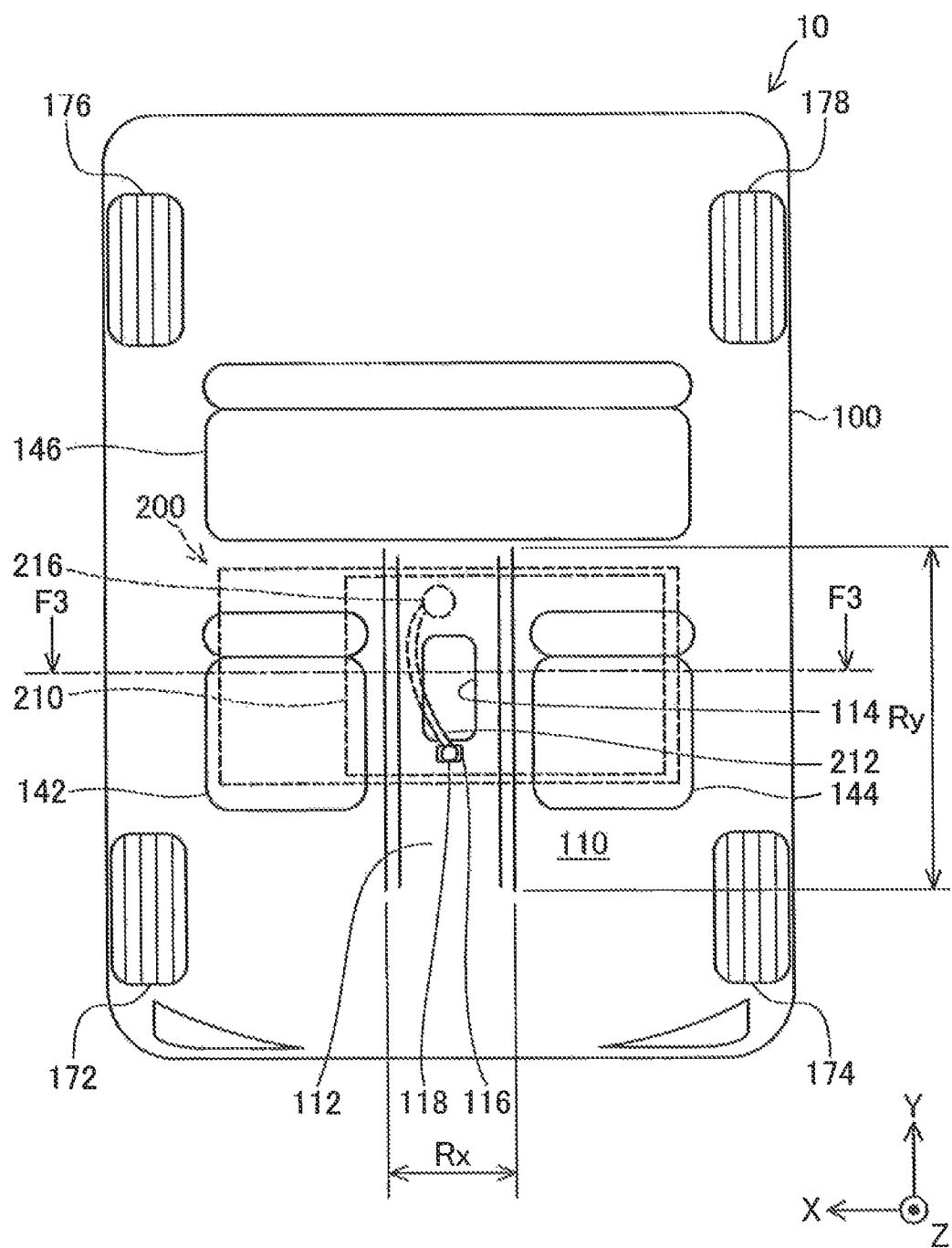
FIG. 1 is a view schematically illustrating a configuration of a vehicle.

FIG. 1 is a view schematically illustrating a configuration of a vehicle 10. An X-Y-Z coordinate system in which X-axis, Y-axis and Z-axis intersect perpendicularly to each other is illustrated in FIG. 1. In FIG. 1, X-axis is an axis of coordinates which goes from the left to the right of the vehicle 10 when the vehicle 10 are seen from the rear, Y-axis is an axis of coordinates which goes from the front to the rear of the vehicle 10, and Z-axis is an axis of coordinates which goes to up from down in the gravity direction. The X-Y-Z coordinate system of FIG. 1 corresponds to X-Y-Z coordinate system of other drawings.

The vehicle 10 includes a vehicle body 100 and a fuel cell module 200. The vehicle 10 moves by electric motor(s) to winch power generated in the fuel cell module 200 is supplied.

The fuel cell module 200 of the vehicle 10 is a device which accommodates a fuel cell stack 210 therein. The fuel cell stack 210 has a stacked structure formed by stacking a plurality of unit cells. Each unit cell generates power by electrochemical reactions of reactive gas. In this embodiment, the fuel cell stack 210 generates power by electrochemical reactions of hydrogen and oxygen, while being supplied with hydrogen gas and air.

The vehicle body 100 of the vehicle 10 constitutes an outer shell of the vehicle 10. In this embodiment, the vehicle body 100 has a monocoque structure. In other embodiments, the vehicle body 100 may have a frame structure. Seats 142, 144 and 148, and wheels 172, 174, 178 and 178 are provided to the vehicle body 100.

The seats 142, 144 and 146 are configured so that a vehicle operator and passengers can seat thereon. The seat 142 is located on the right side (positive in the X-axis directions) of the vehicle body 100. The seat 144 is located on the left side (negative in the X-axis directional of the vehicle body 100. The seat 148 is located rearward (positive in the Y-axis directions) from the seat 142 and the seat 144.

The wheels 172, 174, 178 and 178 are driven using the power generated in the fuel cell module 200. The wheel 172 is located on a front right side (positive in the X-axis directions and negative in the Y-axis directions) of the vehicle body 100. The wheel 174 is located on a front left side (negative in the X-axis directions and negative in the Y-axis directions) of the vehicle body 100. The wheel 176 is located on a rear right side (positive in the X-axis directions and positive in the Y-axis directions) of the vehicle body 100. The wheel 178 is located on a rear left side (negative in the X-axis directions and positive in the Y-axis directions) of the vehicle body 100. In other embodiments, the driving wheels of the vehicle 10 may only be the wheels 172 and 174 located forward, or may only be the wheels 176 and 178 located rearward.

The vehicle body 100 of the vehicle 10 is provided with a plate-like member 110 which is formed by forming a thin plate. The plate-like member 110 constitutes at least a part of a floor portion of the vehicle body 100. In this embodiment, the plate-like member 110 constitutes a part of the floor portion of the vehicle body 100. In other embodiments, the plate-like member 110 may constitute the entire floor portion of the vehicle body 100. The fuel cell module 200 is provided downward in the gravity direction (negative in the Z-axis directions) of the plate-like member 110.

The plate-like member 110 has conductivity. In this embodiment, the plate-like member 110 is a member made of metal (e.g., ferrous metal, aluminum alloy, etc.) having conductivity. In other embodiments, the plate-like member 110 may be a member made of carbon fibers having conductivity.

Figure 2:
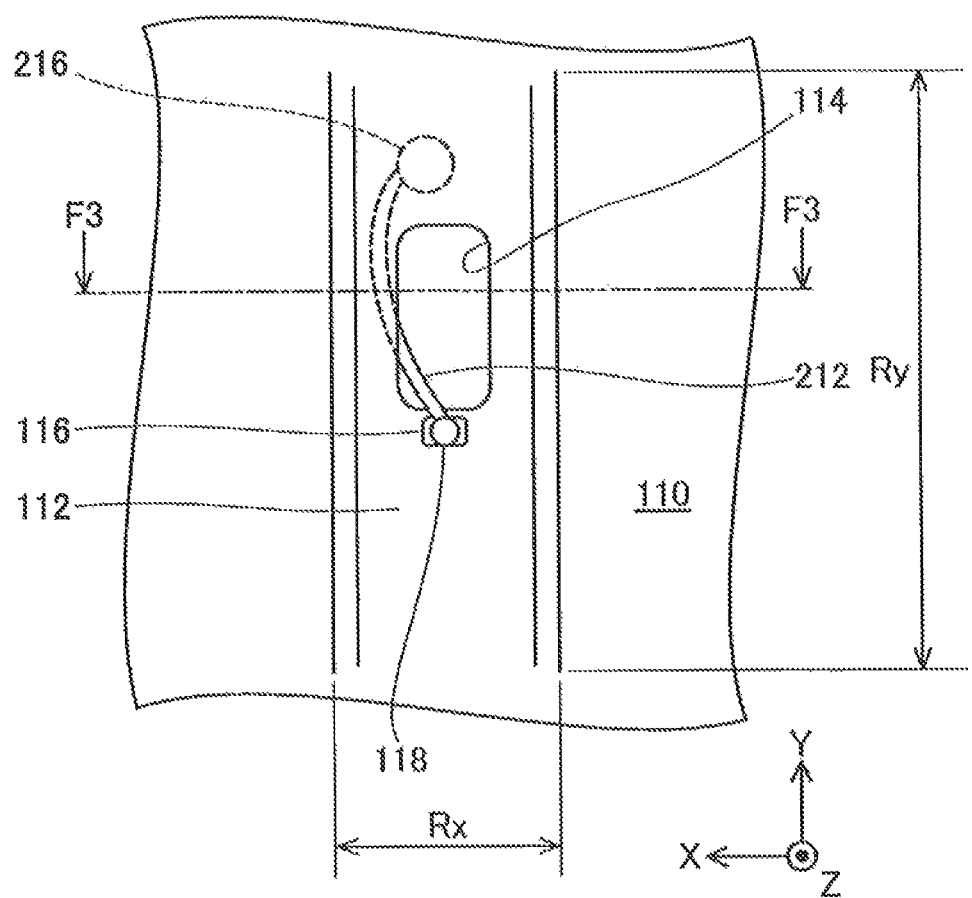
FIG. 2 is an enlarged view illustrating a plate dike member.
Figure 3:
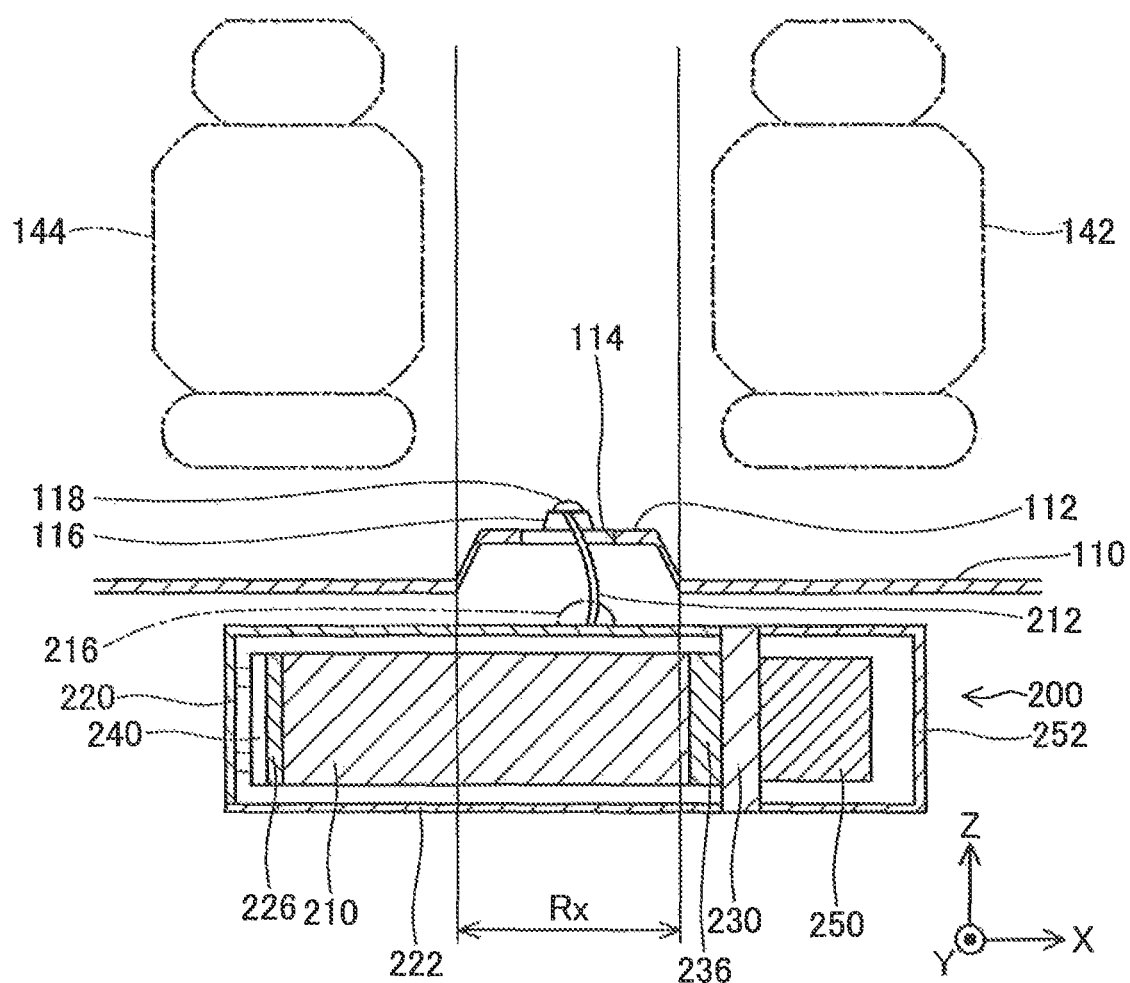
FIG. 3 is a cross-sectional view illustrating a cross-sectional shape of the vehicle.

FIG. 2 is a partial enlarged view illustrating the plate-like member 110. FIG. 3 is a cross-sectional view illustrating a cross-sectional shape of the vehicle 10. The cross-sectional view of FIG. 3 illustrates a cross section of the vehicle 10 taken along a line F3-F3 of FIG. 1.

A protruded portion 112 is formed in the plate-like member 110. The protruded portion 112 is a portion of the plate-like member 110, which protrudes upwardly in the gravity direction (positive in the Z-axis directions) and extends from the front to the rear of the vehicle 10. In this embodiment, the protruded portion 112 is located at the center of the vehicle 10 in vehicle width directions (X-axis directions). The phrase "located at the center" as used herein refers that the protruded portion 112 is located at the area where the protruded portion exists as seen in the gravity directions overlaps with the center in the vehicle width directions (X-axis directions) of the vehicle 10. In this embodiment, the protruded portion 112 is located between the seat 142 and the seat 144 in the vehicle width directions (X-axis directions) of the vehicle 10.

A grounding wire 212 extending from the fuel cell module 200 is connected with the plate-like member 110. In this embodiment, the grounding wire 212 is an insulated wire in which a conducting wire is covered with an insulator. The grounding-wire 212 electrically connects the fuel cell module 200 with the plate-like member 110 within ranges of Rx and Ry where the protruded portion 112 exists as seen in the gravity directions (Z-axis directions). The range Rx is a range where the protruded portion 112 exists in the X-axis directions, and the range Ry is a range where the protruded portion 112 exists in the Y-axis directions. Ends of the ranges Rx and Ry are portions at which the plate-like member 110 begins to protrude upwardly in the gravity directions, from portions where the protruded portion 112 is not formed.

The grounding wire 212 is electrically connected, with a stack case 220, while being electrically insulated from the fuel cell stack 210.

The grounding wire 212 is led out of the fuel cell module 200 through a lead-out portion 216 formed in the fuel cell module 200. The lead-out portion 216 has a waterproof structure for preventing water from entering into the connection between the fuel cell module 200 and the grounding wire 212. In this embodiment, the lead-out portion 216 is located in a part of the fuel cell module 200 on the protruded portion 112 side.

In this embodiment, a through-hole 114 which penetrates a part of the protruded portion 112 is formed in the plate-like member 110. In this embodiment, the through-hole 114 is located at the center of the protruded portion 112 in the vehicle width directions (X-axis directions) of the vehicle 10.

A fastening portion 118 is formed in the plate-like member 110. The grounding wire 212 is fastened to the fastening portion 116. In this embodiment, the fastening portion 116 is located upward (positive in the Z-axis directions) from the through-hole 114 in the gravity directions. In this embodiment, the fastening portion 116 fastens so that the grounding wire 212 extending through the through-hole 114 from the fuel cell module 200 is electrically connected with the plate-like member 110. In this embodiment, the fastening portion 116 is a part of the protruded portion 112, which protrudes upwardly in the gravity directions (positive in the Z-axis directions). In other embodiments, the fastening portion 116 may be a separate member from the protruded portion 112 which is attached to the protruded portion 112.

In this embodiment, the grounding wire 212 is fastened to the fastening portion 116 with a grounding bolt 118. In other embodiments, the grounding wire 212 may be fastened to the fastening portion 116 with a connector, or may be fastened to the fastening portion 116 by welding.

As illustrated in FIG. 3, the fuel cell module 200 includes, in addition to the fuel cell stack 210 and the lead-out portion 216, the stack case 220, a lower cover 222, an insulating plate 226, a stack manifold 230, an insulating plate 236, an end plate 240, an auxiliary machinery 250, and an auxiliary-machinery cover 252.

The stack case 220 of the fuel cell module 200 is a conductor formed in a box shape. The fuel cell stack 210 is accommodated in the stack case 220. In this embodiment, the stack case 220 is made of aluminum alloy. In this embodiment, the grounding wire 212 is fastened to the stack case 220.

The lower cover 222 of the fuel cell module 200 is a conductor formed in a plate shape. The lower cover 222 is attached to an opening of the stack case 220 to seal the fuel cell stack 210 inside the stack case 220. In this embodiment, the lower cover 222 is made of ferrous metal.

The insulating plate 226 of the fuel cell module 200 is an insulator disposed between the fuel cell stack 210 and the end plate 240. The insulating plate 226 electrically insulates between the fuel cell stack 210 and the end plate 240.

The stack manifold 230 of the fuel cell module 200 is a conductor formed in a plate shape. Various flow paths in which reactive gas and cooling medium flow to the fuel cell stack 210 are formed in the stack manifold 230. The stack manifold 230 is attached to the stack case 220. In this embodiment, the stack manifold 230 is made of aluminum alloy.

The insulating plate 236 of the fuel cell module 200 is an insulator disposed between the fuel cell stack 210 and the stack manifold 230. The insulating plate 236 electrically insulates between the fuel cell stack 210 and the stack manifold 230.

The end plate 240 of the fuel cell module 200 holds the fuel cell stack 210 inside the stack case 220 via the insulating plate 226.

The auxiliary machinery 250 of the fuel cell module 200 supplies hydrogen and air to the fuel cell stack 210. In this embodiment, the auxiliary machinery 250 is attached to the stack manifold 230.

The auxiliary-machinery cover 252 of the fuel cell module 200 is a conductor covering the auxiliary machinery 250. In this embodiment, the auxiliary-machinery cover 252 is attached to the stack manifold 230. In this embodiment, the auxiliary-machinery cover 252 is made of aluminum alloy.

According to the embodiment described above, the protruded portion 112 with relatively high rigidity in the floor portion of the vehicle body 100 can prevent damages to the grounding wire 212 due to a deformation of the vehicle body 100.

The grounding wire 212 extending through the through-hole 114 from the fuel cell module 200 is fastened to the fastening portion 116 located upward in the gravity directions from the through-hole 114. Therefore, a possibility that water entering via the through-hole 114 from outside the floor portion of the vehicle body 100 reaches the fastening portion 116 can be reduced. As a result, a generation of rust in the fastening portion 116 can be reduced.

The grounding wire 212 electrically connects the part of the fuel cell module 200 on the protruded portion 112 side with the plate-like member 110 within, the ranges of Rx and Ry where the protruded portion 112 exists as seen in the gravity directions. Therefore, the grounding wire 212 can be disposed in the area between the fuel cell module 200 and the protruded portion 112. As a result, the damages to the grounding wire 212 can further be prevented.

The protruded portion 112 is located at the center in the vehicle width directions (X-axis directions) of the vehicle 10. Therefore, when the vehicle 10 receives an impact from the side (X-axis direction), a possible deformation of the protruded portion 112 can be reduced. As a result, the damages to the grounding wire 212 can further be prevented.

The protruded portion 112 is located between the seat 142 and the seat 144 in the vehicle width directions (X-axis directions) of the vehicle 10. Therefore, since the protruded portion 112 is located at the part of the vehicle body 100 between the seats, which is relatively hard to be deformed against the impact, the damages to the grounding wire 212 can further be prevented.

The present invention is not limited to the embodiment and the modifications described above, and can be implemented in various structures without departing from the scope of the invention. For example, technical features in the embodiment and the modifications corresponding to technical features of each aspect cited in the section of "SUMMARY OF THE INVENTION," can suitably be substituted and/or combined in order to address some or all of the subjects described above, or in order to obtain some or all of the effects described, above. The technical features can suitably be deleted if they are not described as essential matters in this specification.

DESCRIPTION OF REFERENCE NUMERALS

10 Vehicle
100 Vehicle Body
110 Plate-Like Member
112 Protruded Portion
114 Through-Hole
116 Fastening Portion
118 Grounding Bolt
142, 144 Seat
146 Seat
172, 174, 176, 178 Wheel
200 Fuel Cell Module
210 Fuel Cell Stack
212 Grounding Wire
216 Lead-Out Portion
220 Stack Case
222 Lower Cover
226 Insulating Plate
230 Stack Manifold
236 Insulating Plate
240 End Plate
250 Auxiliary Machinery
252 Auxiliary-machinery cover

What is claimed is:

1. A vehicle, comprising:
    a conductive plate-like member that constitutes at least a part of a floor portion of a vehicle body of the vehicle, and has a protruded portion protruded upwardly in the gravity directions and extended from the front to the rear of the vehicle;
    a fuel cell module that is provided downward in the gravity directions from the plate-like member, and accommodates a fuel cell; and
    a grounding wire that electrically connects the fuel cell module with the plate-like member within a range where the protruded portion exists when seen in the gravity direction,
    wherein the plate-like member includes:
        a through-hole that penetrates a part of the protruded portion; and
        a fastening portion that is located upward in the gravity directions from the through-hole, and is fastened to the grounding wire extended upwards through the through-hole from the fuel cell module, and
    wherein an entirety of the grounding wire is arranged within the range where the protruded portion exists when seen in the gravity direction.

2. The vehicle in accordance with claim 1, wherein the grounding wire electrically connects a part of the fuel cell module on the protruded portion side with the plate-like member within the range where the protruded portion exists when seen in the gravity direction.

3. The vehicle in accordance with claim 1, wherein the protruded portion is located at the center in vehicle width directions of the vehicle.

4. The vehicle in accordance with claim 1, wherein the protruded portion is located between seats in vehicle width directions of the vehicle.

* * * * *